(12) United States Patent
DeLuca et al.

(10) Patent No.: US 10,110,733 B2
(45) Date of Patent: Oct. 23, 2018

(54) POPULATING CONTACT INFORMATION ON AN ELECTRONIC COMMUNICATION DEVICE

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/175,575

(22) Filed: Jun. 7, 2016

(65) Prior Publication Data

US 2017/0353602 A1    Dec. 7, 2017

(51) Int. Cl.
     *H04M 3/42*        (2006.01)
     *H04L 12/58*      (2006.01)
     (Continued)

(52) U.S. Cl.
     CPC ........ *H04M 3/42059* (2013.01); *H04L 51/24* (2013.01); *H04L 67/306* (2013.01);
     (Continued)

(58) Field of Classification Search
     CPC . H04M 3/42059; H04M 3/4365; H04L 51/24; H04L 67/306; H04W 4/16
     See application file for complete search history.

(56) References Cited

U.S. PATENT DOCUMENTS 7,802,191 B2    9/2010    Pettinati et al.
8,296,307 B2   10/2012    Gao et al.
(Continued)

FOREIGN PATENT DOCUMENTS

CN      102970402 A     3/2013

OTHER PUBLICATIONS

Ip.com, "Automated Real-time Contact List Update based on Social Interactions", an IP.com Prior Art Database Technical Disclosure, Authors et al.: Disclosed Anonymously, IP.com No. 000243097, Sep. 15, 2015, 6 pages.

(Continued)

*Primary Examiner* — Marisol Figueroa
(74) *Attorney, Agent, or Firm* — Maeve M. Carpenter; Hunter E. Webb; Keohane & D'Alessandro PLLC

(57) ABSTRACT

Approaches presented herein enable automatically populating contact information of a previously unknown caller/sender in a contact list of an electronic communication device based on a communication (e.g., incoming call or communication message(s)) from the caller/sender. Specifically, a recipient communication device receives a communication (i.e., incoming call or communication message) from a user (i.e., caller or sender) using a sender communication device. When the user is determined to be unknown to the recipient communication device, the content of the communication is analyzed to determine identifying information. One or more searches are performed to determine extended name information using the identifying information. Using the identifying information and extended name information, contact information is determined for the user and may be stored in the contact list of the recipient communication device.

19 Claims, 6 Drawing Sheets

(51) Int. Cl.
*H04L 29/08* (2006.01)
*H04W 4/16* (2009.01)
*H04M 3/436* (2006.01)
*H04W 8/18* (2009.01)

(52) U.S. Cl.
CPC ........... *H04M 3/4365* (2013.01); *H04W 4/16* (2013.01); *H04W 8/183* (2013.01)

(56) References Cited

U.S. PATENT DOCUMENTS

| | | | |
|---|---|---|---|
| 8,311,531 | B2 | 11/2012 | Haaparanta et al. |
| 2002/0049768 | A1* | 4/2002 | Peek ........................ H04M 3/48 |
| 2008/0250066 | A1 | 10/2008 | Ekstrand et al. |
| 2009/0210229 | A1* | 8/2009 | Amento ............ G06F 17/30746 704/251 |
| 2010/0120401 | A1 | 5/2010 | Mears |
| 2011/0014932 | A1* | 1/2011 | Estevez ................... G01S 19/14 455/466 |
| 2012/0210253 | A1 | 8/2012 | Luna et al. |
| 2013/0244623 | A1 | 9/2013 | Cudak et al. |
| 2014/0081914 | A1 | 3/2014 | Smith et al. |
| 2014/0128047 | A1* | 5/2014 | Edwards ................. H04L 51/12 455/415 |
| 2015/0189484 | A1 | 7/2015 | Long |
| 2016/0100050 | A1* | 4/2016 | VanBlon ................. H04W 4/16 455/415 |
| 2016/0156757 | A1* | 6/2016 | Kotab ..................... H04M 1/57 455/415 |
| 2016/0182661 | A1* | 6/2016 | Brezina ................. H04M 15/00 709/206 |

OTHER PUBLICATIONS

InformationWeek Connecting the Business Technology Community, Motorola Unveils Android 'Cliq', http://www.informationweek.com/mobile/mobile-devices/motorola-unvei . . . , 2009, 2 pages.

Mashable, "Effortlessly Share Contact Info From Your Mobile Phone", http://mashable.com/2009/02/24/dubmenow/#fGonVGJRFOqu, Feb. 24, 2009, 10 pages.

Taylor Martin, "How to get the Google Dialer on non-Nexus phones", http://pocketnow.com/2013/12/26/install-google-dialer, Dec. 26, 2013, 5 pages.

* cited by examiner

POPULATING CONTACT INFORMATION ON AN ELECTRONIC COMMUNICATION DEVICE

TECHNICAL FIELD

This invention relates generally to electronic communication devices and, more specifically, to automatically populating contact information of a previously unknown caller/sender in a contact list of an electronic communication device based on a communication (e.g., incoming call or communication message(s)) from the caller/sender.

BACKGROUND

Electronic communication devices have become increasingly popular and are now in widespread use. In addition, the features associated with certain types of electronic communication devices have become increasingly diverse. Due to the now almost ubiquitous nature of electronic communication devices, people of all ages and education levels are utilizing the devices to communicate with other individuals or contacts, receive services and/or share information, media, and other content. One area in which there is a demand to increase ease of convenience to users relates to the handling of incoming calls and communication messages that are received from one or more communication devices via one or more communication methods. The communication methods may enable a user of an electronic communication device (hereinafter simply referred to as "communication device") to communicate by telephone (i.e., voice), email, instant messaging (IM), text messaging (also called short messaging service or SMS), and/or multimedia messaging service (MMS).

SUMMARY

In general, embodiments described herein provide approaches for automatically populating contact information of a previously unknown caller/sender in a contact list of an electronic communication device based on a communication (e.g., incoming call or communication message(s)) from the caller/sender. Specifically, a recipient communication device receives a communication (i.e., incoming call or communication message) from a user (i.e., caller or sender) using a sender communication device. When the user is determined to be unknown to the recipient communication device, the content of the communication is analyzed to determine identifying information. One or more searches are performed to determine extended name information using the identifying information. Using the identifying information and extended name information, contact information is determined for the user and may be stored in the contact list of the recipient communication device.

One aspect of the present invention includes a computer-implemented method for automatically generating contact information of a caller/sender for a contact list of a recipient communication device, comprising: receiving a communication on the recipient communication device from the caller/sender using a sender communication device; determining a sender identifier associated with an incoming portion of the communication; determining the caller/sender is unknown to the recipient communication device based on the sender identifier; analyzing a content of the communication to determine identifying information for the caller/sender; performing one or more searches to determine extended name information using the identifying information; and generating contact information based on at least one of the identifying information or the extended name information.

Another aspect of the present invention includes a computer system for automatically generating contact information of a caller/sender for a contact list of a recipient communication device, the computer system comprising: a memory medium comprising program instructions; a bus coupled to the memory medium; and a processor for executing the program instructions, the instructions causing the system to: receive a communication on the recipient communication device from the caller/sender using a sender communication device; determine a sender identifier associated with an incoming portion of the communication; determine the caller/sender is unknown to the recipient communication device based on the sender identifier; analyze a content of the communication to determine identifying information for the caller/sender; perform one or more searches via a network to determine extended name information using the identifying information; and generate contact information based on at least one of the identifying information or the extended name information.

Yet another aspect of the present invention includes a computer program product for automatically generating contact information of a caller/sender for a contact list of a recipient communication device, the computer program product comprising a computer readable storage device, and program instructions stored on the computer readable storage device, to: receive a communication on the recipient communication device from the caller/sender using a sender communication device; determine a sender identifier associated with an incoming portion of the communication; determine the caller/sender is unknown to the recipient communication device based on the sender identifier; analyze a content of the communication to determine identifying information for the caller/sender; perform one or more searches via a network to determine extended name information using the identifying information; and generate contact information based on at least one of the identifying information or the extended name information.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
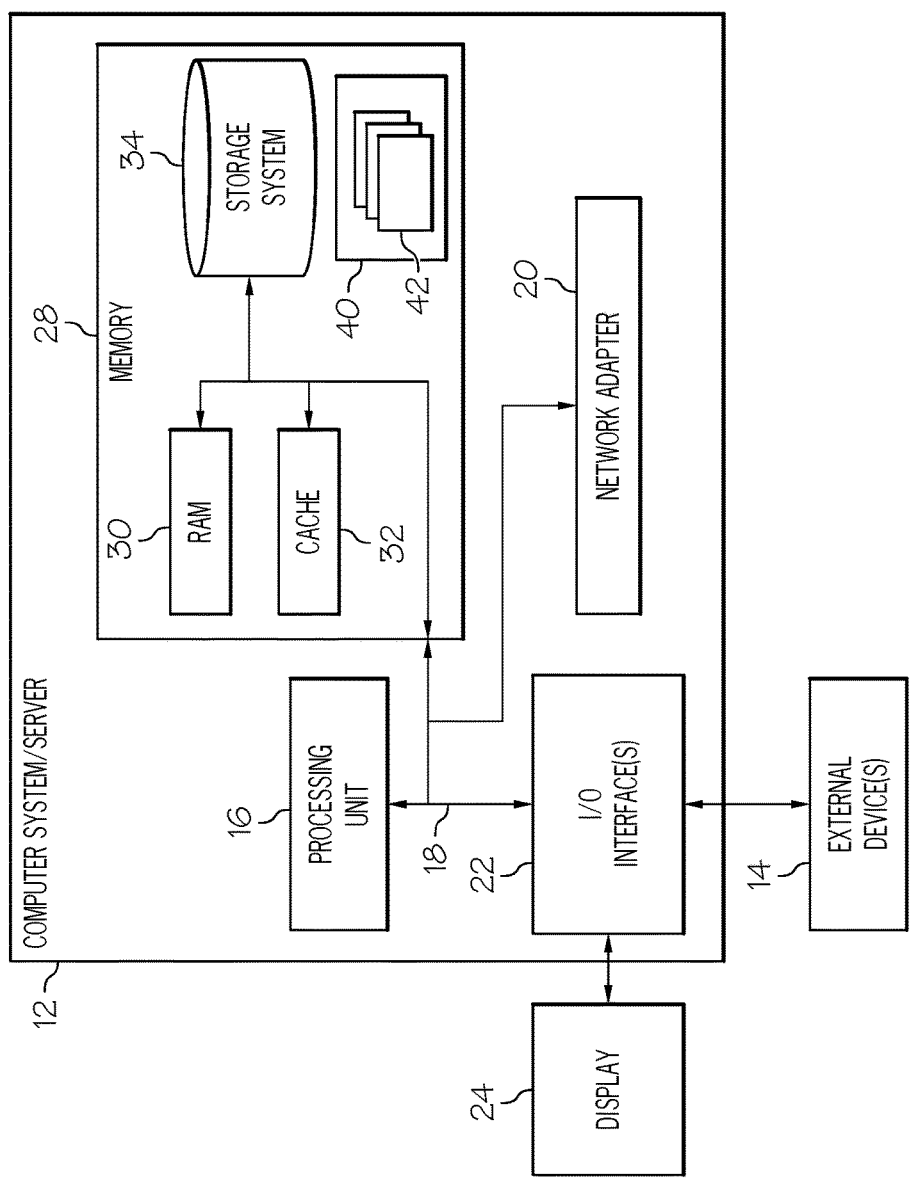
FIG. 1 shows an architecture 10 in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide approaches for automatically populating contact information of a previously unknown caller/sender in a contact list of an electronic communication device based on a communication (e.g., incoming call or communication message(s)) from the caller/sender. Specifically, a recipient communication device receives a communication (i.e., incoming call or communication message) from a user (i.e., caller or sender) using a sender communication device. When the user is determined to be unknown to the recipient communication device, the content of the communication is analyzed to determine identifying information. One or more searches are performed to determine extended name information using the identifying information. Using the identifying information and extended name information, contact information is determined for the user and may be stored in the contact list of the recipient communication device.

A communication device may access a contact list for storing contact information of individuals known by a user of the communication device. The contact list may be stored locally on the communication device and/or remotely (e.g., another device, a remote server, etc.). Contact information may include a name, home telephone number, work telephone number, cell phone number, home address, photograph, and/or the like. This information can be used for incoming and outgoing communications, such as voice calls, video calls, text messages, email messages, etc. For example, as a call is received on the communication device, an image and/or name can be displayed on a screen of the communication device. For outgoing calls, a particular individual's contact information can be quickly retrieved and then used to place a call to that individual. In this context, the contact information can be used as a personal phone book, containing phone numbers (or email addresses, etc.) of individuals that may be contacted by the user of the communication device.

The inventors of the invention described herein have recognized certain deficiencies in known methods for providing contact information when receiving an incoming call or communication message. A user of a communication device may call or send a message to a user of another communication device via any of the above-mentioned communication methods. Typically, the receiving communication device (e.g., also referred to herein as recipient communication device) recognizes if the incoming call or communication message is sent from a caller/sender that is identified in its contact list (e.g., phonebook) and the caller/sender's name and photograph are typically shown on a display (not shown) of the communication device.

However, in some instances, the recipient communication device may not have access to the contact information associated with the caller/sender of the incoming call/communication message saved in its contact list. As such, the contact information (e.g., a contact name) associated with the caller/sender may be unknown to the recipient communication device. In other words, contact information related to the caller/sender may not be stored in the contact list of the recipient communication device. Typically, a user must manually add the contact information in the user's contact list of the recipient communication device for the caller/sender if the user wishes the contact information (e.g., name, photograph) to be displayed on the recipient communication device for future incoming calls and/or communication messages from the caller/sender. The approaches described herein provide a seamless way for automatically connecting incoming interactions from a previously unrecognized number with contact information (e.g., name, photograph, etc.) derived from accessible sources (web sites, social media sites, directories, etc.). Furthermore, after establishing the caller/sender in the contact list, all previous communications may be connected to the caller/sender. For example, all previous voice calls, text messages, and/or email messages from the caller/sender may now be associated with the contact information of the caller/sender.

Referring now to FIG. 1, a computerized implementation 10 of an embodiment for automatically populating contact information of a previously unknown caller/sender in a contact list of an electronic communication device based on a communication (e.g., incoming call or communication message(s)) from the caller/sender will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system 12 is intended to demonstrate that some or all of the components of implementation 10 could be deployed, managed, serviced, etc., by a service provider who offers to implement, deploy, and/or perform the functions of the present invention for others.

Computer system 12 is intended to represent any type of computer system that may be implemented in deploying/realizing the teachings recited herein. Computer system 12 may be described in the general context of computer system executable instructions, such as program modules, being executed by a computer system. Generally, program modules may include routines, programs, objects, components, logic, data structures, and so on, that perform particular tasks or implement particular abstract data types. In this particular example, computer system 12 represents an illustrative system for automatically populating contact information of a previously unknown caller/sender in a contact list of an electronic communication device based on a communication (e.g., incoming call or communication message(s)) from the caller/sender. It should be understood that any other computers implemented under the present invention may have different components/software, but can perform similar functions.

Computer system 12 in computerized implementation 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for automatically populating contact information of a previously unknown caller/sender in a contact list of an electronic communication device based on a communication (e.g., incoming call or communication message(s)) from the caller/sender, which is stored in memory 28, storage system 34, and/or program/utility 40. While executing computer program code, processing unit 16 can read and/or write data to/from memory 28, storage system 34, and program/utility 40.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
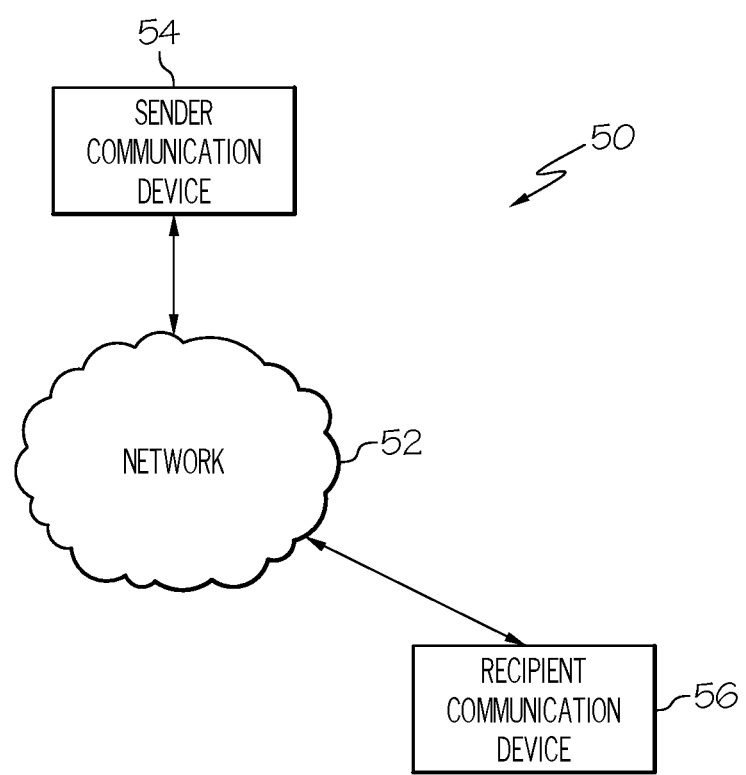
FIG. 2 shows a generic system diagram 50 in which a communication device receiving a communication is shown in an exemplary communication environment according to illustrative embodiments.

FIG. 2 illustrates a generic system diagram 50 in which a communication device receiving an incoming call/communication message (e.g., recipient communication device 56) is shown in an exemplary communication environment. As shown in FIG. 2, an embodiment of a system in accordance with an example embodiment may include wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques, or the like.

ing an incoming call/communication message (e.g., recipient communication device 56) is shown in an exemplary communication environment. As shown in FIG. 2, an embodiment of a system in accordance with an example embodiment may include wireline or wireless communication techniques, including Local Area Network (LAN), Wireless LAN (WLAN), Worldwide Interoperability for Microwave Access (WiMAX), Wireless Fidelity (WiFi), Ultra-Wide Band (UWB), Wibree techniques, or the like.

As such, sender communication device 54 and recipient communication device 56 may be enabled to communicate with network 52 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS), and/or the like may be supported as well as wireless access mechanisms such as WLAN, WiMAX, and/or the like and fixed access mechanisms such as Digital Subscriber Line (DSL), cable modems, Ethernet, and/or the like.

In example embodiments, recipient communication device 56 (and sender communication device 54) may include, but is not limited to, a smart phone, a cellular phone, a Voice over Internet Protocol (VoIP) phone, a personal data assistant (PDA), a landline phone, a tablet, or any other communication device capable of establishing a phone call and/or communication message session over network 52. In an exemplary embodiment, recipient communication device 56 may employ a computer system (e.g., computer system 12 of FIG. 1) capable of employing embodiments of the invention.

Figure 3:
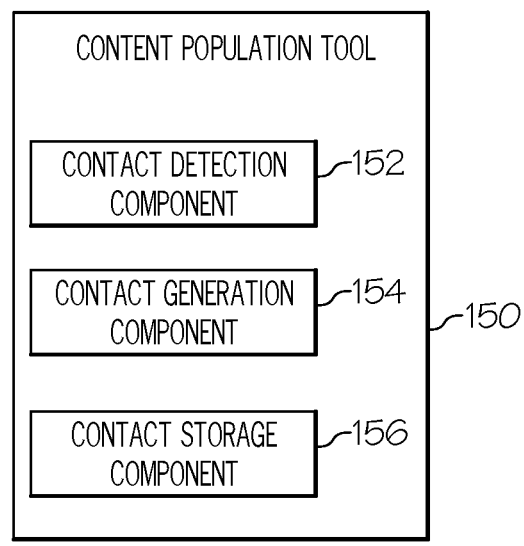
FIG. 3 shows a block diagram illustrating a content population tool 150 according to illustrative embodiments.

Referring now to FIG. 3, content population tool 150 for automatically populating contact information of a previously unknown caller/sender in a contact list of an electronic communication device based on a communication (e.g., incoming call or communication message(s)) from the caller/sender is shown. In an exemplary embodiment, recipient communication device 56 may employ a content population tool (hereinafter "system 150"). As depicted, system 150 is shown within computer system/server 12. In general, system 150 can be implemented as program/utility 40 on computer system 12 of FIG. 1 and can enable the functions recited herein. It is further understood that system 150 may be incorporated within or work in conjunction with any type of system that receives, processes, and/or executes commands with respect to IT resources in a networked computing environment. Such other system(s) have not been shown in FIG. 3 for brevity purposes.

Contact detection component 152 of system 150, as executed by computer system/server 12, is configured to receive a communication (e.g., phone call, communication message, etc.) from a caller/sender using sender communication device 54. Contact detection component 152 determines a sender identifier associated with an incoming portion of the communication. Further, contact detection component 152 may determine whether the caller/sender is unknown to the recipient communication device 56 (i.e., not included in a contact list of the recipient communication device 56) based on the sender identifier. In one example, the contact list may be stored in a memory of the receiving communication device (e.g., memory 28 of recipient communication device 56). In another example, the contact list may be stored remotely, such as on a separate device or server. In a typical embodiment, the sender identifier is a phone number associated with the caller/sender. However, it should be pointed out that a sender identifier as referred to herein may include, but is not limited to, a phone number, email address, IM screen name, username, or the like.

As referred to herein, the communication may include, but is not limited to, phone calls (e.g., audio or voice data communication), video calls (e.g., video and audio data communication), or one or more communication messages. Communication messages may include, but are not limited to, voice messages, short message service (SMS) messages (e.g., text messages), multimedia messaging service (MMS) messages (e.g., video messages), instant messages (e.g., chat messages), or the like.

When the contact detection component 152 determines that the sender identifier is included in a contact list of the recipient communication device 56, the contact detection component 152 is configured to instruct a display (not shown) of the recipient communication device 56 to show a contact name and sender identifier associated with the incoming call/communication message, as well as any other suitable information (e.g., a photograph of the sender/caller). On the other hand, when the contact detection component 152 determines that the sender identifier is not listed in a contact list of the recipient communication device 56, the contact detection component 152 may determine that the incoming call/communication message is associated with a contact that is unknown (also referred to herein as unknown contact) to the recipient communication device 56.

Contact generation component 154 of system 150, as executed by computer system/server 12, is configured to analyze and parse the communication for identifying information, such as the name of the caller/sender and/or a business name associated with the caller/sender. For example, a caller may say, "Good morning. This is Joe Smith" or "Good evening. This is Mary from Acme Enterprises". In the first example, "Joe Smith" may be extracted as a contact name for the caller. In the second example, "Mary" may be extracted as a contact name for the caller, while "Acme Enterprises" may also be extracted as a business name associated with Mary. For incoming voice calls, speech analysis, voice signature analysis, and/or other speech parsing algorithms can be applied to review and analyze the context/content of the incoming call. For communication messages (e.g., text or email messages), text analysis, natural language processing and/or other message, parsing algorithms can be applied to review and analyze the context/content of the communication message.

Additionally, contact generation component 154 may perform one or more general searches via a network (e.g., the Internet) for extended name information (e.g., last name) pertaining to the caller/sender using any gathered identifying information (contact name, business name, etc.). In the second example from above (i.e., Mary from Acme Enterprises), contact generation component 154 may determine extended contact information (e.g., Mary's last name) by searching online social or messaging networks (e.g., Facebook®, LinkedIn®, Yahoo!Mail®, Gmail®, etc.), corporate profiles (e.g., an internal corporate directory), and/or scholastic directories using the caller's first name to determine the caller's last name. The searches may yield any number of contact name/business name options. For example, three last name options (e.g., Mary Smith, Mary Jones, and Mary Brown) may be determined for Mary based on the searches described above.

In one embodiment, contact generation component 154 may narrow the options retrieved from the Internet searches based on the content of the voice or message exchange. For example, an area code of the sender's phone number, other names and locations used in the exchange (e.g., "I heard that from Sarah" or "when I was at Jane Doe's house"), a voice signature of the caller on an incoming call, and/or a business name determined by contact detection component 152 may be used to narrow the search results.

For example, contact generation component 154 may capture a voice signature of the caller from an incoming call. A voice signature is a computer analysis of a person's voice (e.g., the caller) to verify an identity claim with a high degree of accuracy. Any system commonly known in the art may be used to extract the voice signature. The captured voice signature may be used to narrow the extended contact information (e.g., last name) options. In a social network, a person may attach a known voice signature to any number of contacts. Shared connections in the social network may be leveraged by content generation component 154 to match contacts against known voice signatures. For example, Dana and Aaron each have a social network connection to Lisa. Dana has a voice signature of Lisa based on previous interactions. Lisa calls Aaron and Aaron and Lisa talk. In this example, Aaron receives Lisa's call using recipient communication device 56 employing content population tool 150. Lisa is an unknown contact for Aaron. Contact detection component 152 captures a voice signature for Lisa during their conversation. Contact generation component 154 compares Lisa's voice signature against existing shared voice signatures of Aaron's social contacts. Contact generation component 154 matches Dana's stored voice signature for Lisa. Contact generation component 154 determines that Lisa is a shared social network contact between Aaron and Dana and receives contact information from Dana related to Lisa.

In another example, content detection tool 152 may determine a business or organization name from an incoming call or communication message. For example, a caller may say "Hello. I am Sam Johnson from IBM®". Content detection tool 152 determines the keyword "IBM" (acronym for International Business Machines Corporation) is a valid business name. In one example, the determination may be made by performing a business entity name web search for the state associated with the area code of the caller's phone number. In another example, the determined business or organization name may be determined using other means. Contact generation component 154 associates the keyword with an IBM® local directory. Contact generation component 154 searches the IBM® local directory and finds Sam Johnson within the same organization as the message recipient. Since contact generation component 154 is able to narrow the options down to one name, contact generation component 154 receives contact information related to Sam Johnson from the local directory. Optionally, when the options cannot be narrowed down to one, the recipient of the incoming call/communication message may be prompted to choose the "correct" contact name from a list of options. For example, the list of options may be shown on a display (not shown) of recipient communication device 56.

In one embodiment, contact generation component 154 of system 150, as executed by computer system/server 12, is configured to determine a photograph for a caller/sender of an incoming call/communication message that has been determined to be from an unknown contact. In one example, contact generation component 154 may determine one or more photograph options residing locally on the recipient communication device 56. In another example, when a contact name/business name associated with the caller/sender is determined, contact generation component 154 may perform one or more searches to find one or more photographs of the caller/sender using the contact name/business name and any other available information (e.g., area code, group membership, etc.) from an external server (i.e., the Internet). For example, contact generation component 154 may search one or more websites (e.g., public Google® images) and/or social media sites (e.g., Facebook®, LinkedIn®, etc.) to find one or more photograph options. Alternatively, or in addition, contact generation component 154 may search one or more photograph repositories (e.g., Picasa®, Google+®), corporate profiles (e.g., an internal corporate directory), and/or scholastic directories to find one or more photographs for the caller/sender.

In addition, contact generation component 154 may use tagging information (such as that in Facebook® and Google+®) and/or facial recognition to identify the caller/sender in a photograph with more than one subject in it. Once all photograph options are found, the photograph options are trimmed to isolate the individual. Contact generation component 154 may assess image quality to prioritize optimum sets of images for each contact name/business name. For example, a pixel resolution of each image may be determined when assessing image quality. Optionally, the user may be prompted to choose the "correct" or preferred option from the set of possible/probable photographs for the contact name/business name. Once the photograph options have been narrowed to one (either by one or more searches or user selection), contact storage component 156 may store the determined photograph to the contact list for the previously unrecognized number Referring now to FIG. 4, in conjunction with FIGS. 2 and 3 and FIGS. 5 and 6, an implementation of a process 400 for automatically populating contact information of a previously unknown caller/sender in a contact list of an electronic communication device based on a communication (e.g., incoming call or communication message(s)) from the caller/sender is shown. At step 402, contact detection component 152 of recipient communication device 56 receives a communication (e.g., an incoming call/communication message) from sender communication device 54 via network 52. FIG. 5 shows an example text message exchange 500 between Dana (using recipient communication device 56) and Mary (using sender communication device 54). Mary's initial text message 502, Dana's response text message 504, and Mary's reply text message 506 are shown. A sender identifier is determined based on an incoming portion of the communication. At step 404, contact detection component 152 determines whether the sender identifier (i.e., phone number) is associated with a known contact in a contact list of recipient communication device 52. If contact detection component 152 determines the caller/sender is in the recipient's contact list, the contact detection component 152 is configured to instruct a display of the recipient communication device 56 to show a contact name and sender identifier (e.g., phone number) associated with the incoming call/communication message as well as any other suitable information (e.g., photograph of caller/sender).

In the example of FIG. 5, contact detection component 152 receives the text message 502 from sender communication device 54 and determines the sender identifier (e.g., phone number) is not listed in a contact list of Dana, the recipient. At 408, contact generation component 154 determines identifying information related to the caller/sender based on the entire content of the conversation, including both incoming and any outgoing exchanges of the conversation, such as in a bi-directional phone call. In one embodiment, historical communications related to the sender identifier may also be analyzed.

Continuing with the example of FIG. 5, a first name (e.g., Mary), but no business name, is determined based on the content of the received text message 502. At 410, a determination is made whether a complete contact name/business name has been found. If not, contact generation component 154 attempts to determine extended name information (e.g., last name) at 412 based on the gathered identifying information.

In this example, contact generation component 154 searches for a last name to associate with Mary. First, contact generation component 154 searches Dana's (the recipient) own book club mailing list to determine additional contacts. Additional contacts Liz, Jessie, and Mark are found. Next, contact generation component 154 searches the Facebook® pages of Liz, Jessie, and Mark for friends having Mary as a first name in an attempt to determine last name options for Mary. Three people are found: Mary Jones of California, Mary Brown of Maine, and Mary Smith of North Carolina (the same state as Dana). At 414, contact generation component 154 narrows the options in the searches based on the content of the incoming call/message communication. The portion of text message 506 includes "On my way, it will take 10 minutes" narrows the selection to Mary Smith who resides in the same state as Dana, a common friend of Liz and Jessie.

At 416, contact generation component 154 determines photograph options for each contact name/business name option. Continuing the example above, Liz and Jessie each have Mary Smith tagged in several Facebook® photographs. Further, Liz has Mary identified in a caption in one of her Google+® photographs and facial recognition identifies the person in the photograph as Mary Smith. Once photograph options are found, tagging information (such as that in Facebook® and Google+®) and facial recognition may be used to identify the caller/sender in photograph(s) having multiple individuals pictured. For example, Facebook® tags identify Mary Smith in several group photographs. Each photograph option is trimmed to isolate the individual. Image quality is assessed to prioritize an optimum set of images. Optionally, the user is prompted to choose the "correct" option from the set of photograph options.

It should be noted that contact generation component 154 may be unable to generate contact information based on at least one of the identifying information or the extended name information until the communication exchange has ended and the entire communication can be analyzed. After establishing the caller/sender in the contact list, all previous communications may be connected to the caller/sender. For example, all previous voice calls, text messages, and/or email messages from the caller/sender may now be associated with the contact information of the caller/sender. At 418, the determined contact information (e.g., name and photograph) may be stored for the previously unrecognized number in a contact list of recipient communication device 56.

In one embodiment, a user of recipient communication device 56 may be prompted whether to include the contact information in a contact list of the recipient communication device 56. This is useful when the contact from the caller/sender will happen only once (e.g., from a telemarketer) and the user wishes not to add the caller/sender to the contact list. Optionally, a user may choose to save the contact information in a contact list so the user will be able to determine whether to answer an incoming call or respond to a communication message, or so that historical call logs or email histories will associate the contact information with the logged messages. For example, a user may save the contact information of a telemarketer including a generic photograph (such as image 600 of FIG. 6). An incoming call from the telemarketer may show photograph 600 on a display of recipient communication device 56, quickly alerting the user not to answer the call.

Figure 4:
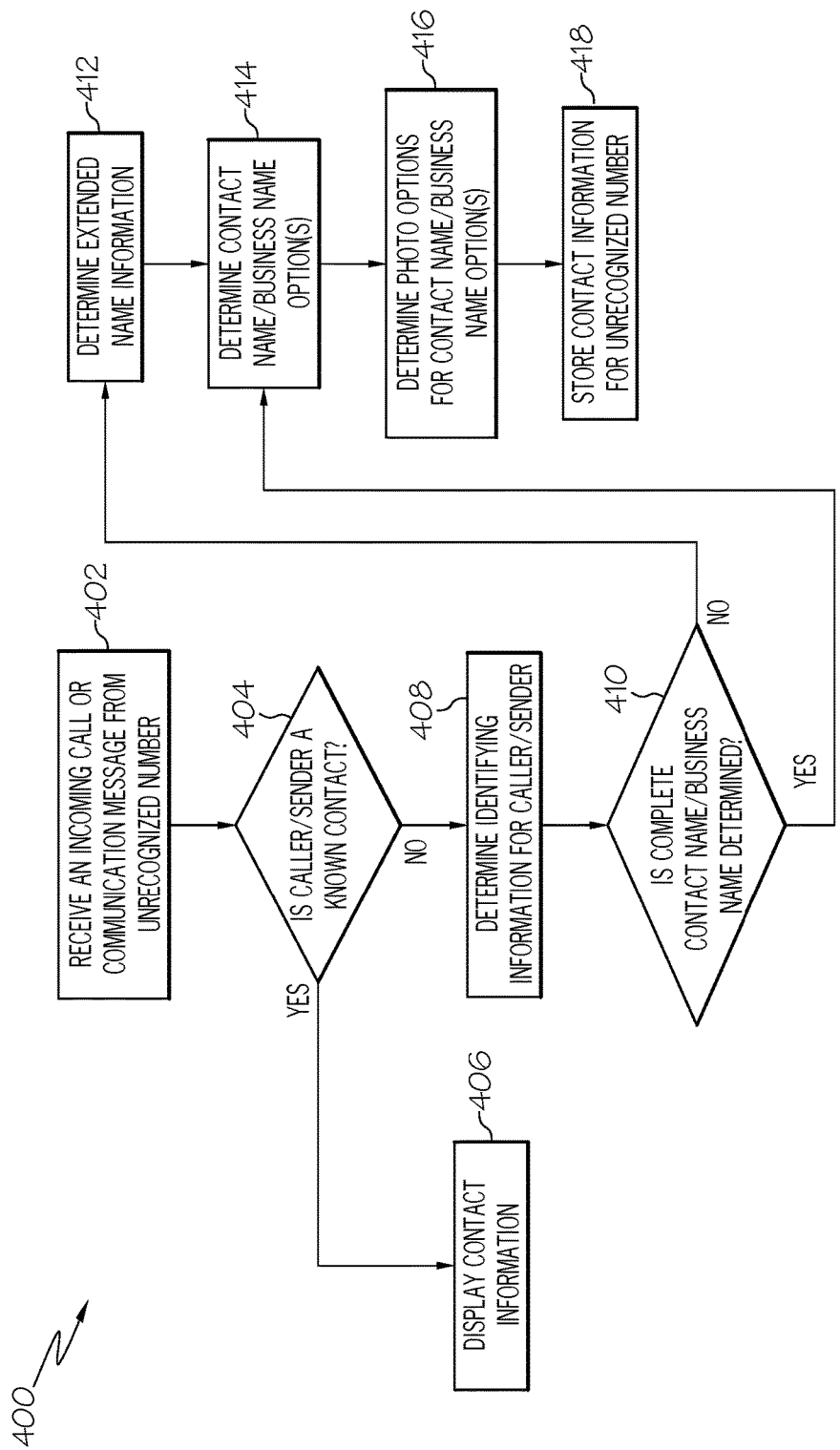
FIG. 4 shows a process flowchart 400 for automatically populating contact information of a previously unknown caller/sender in a contact list of an electronic communication device based on a communication (e.g., incoming call or communication message(s)) from the caller/sender according to illustrative embodiments.
Figure 5:
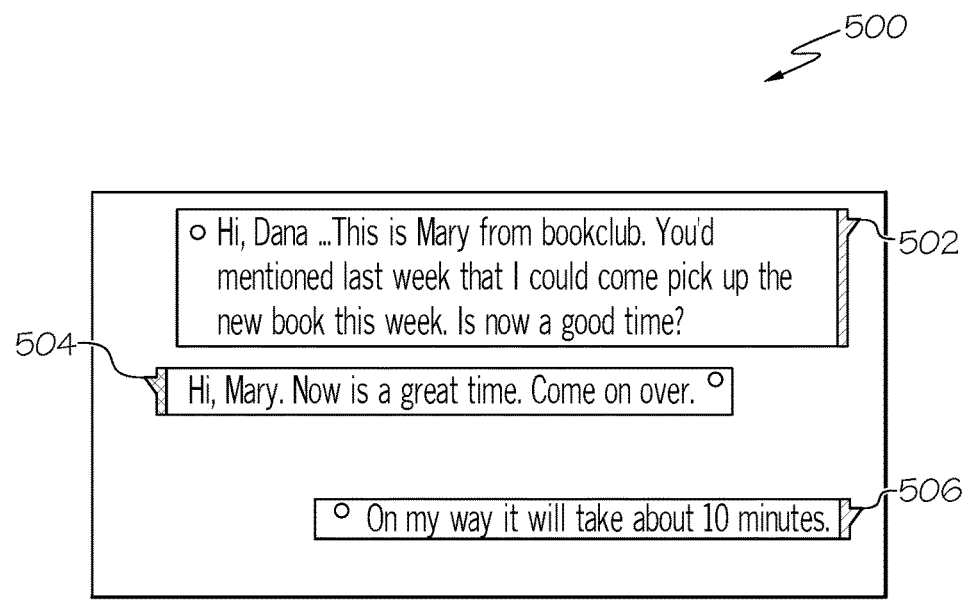
FIG. 5 shows an example message exchange according to illustrative embodiments.
Figure 6:
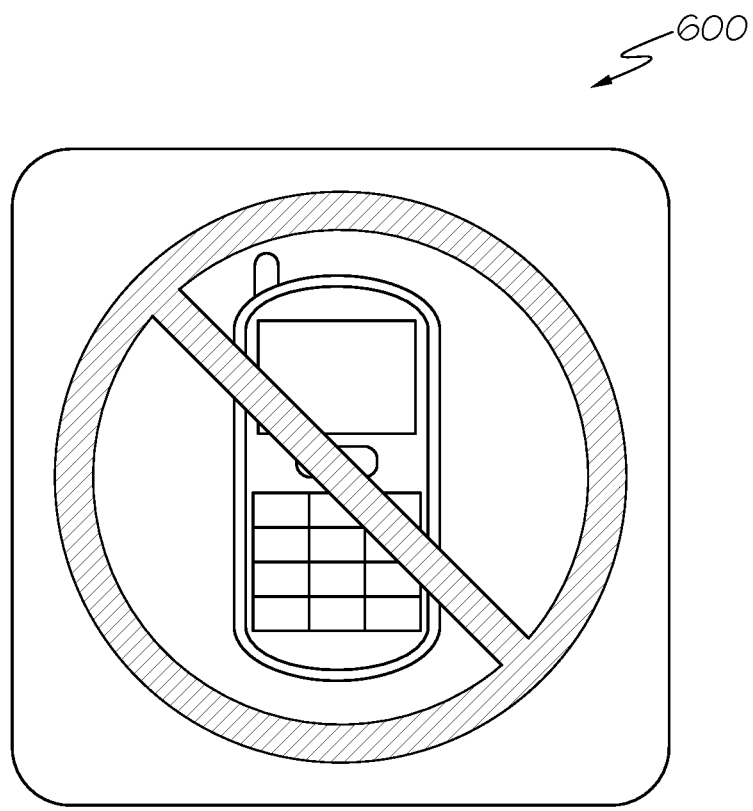
FIG. 6 shows an example icon associated with a caller/sender according to illustrative embodiments.

Process flowchart 400 of FIG. 4 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for automatically populating contact information of a previously unknown caller/sender in a contact list of an electronic communication device based on a communication (e.g., incoming call or communication message(s)) from the caller/sender. Thus, embodiments herein disclose a process for supporting computer infrastructure, comprising integrating, hosting, maintaining, and deploying computer-readable code into a computing system (e.g., computer system 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for automatically populating contact information of a previously unknown caller/sender in a contact list of an electronic communication device based on a communication (e.g., incoming call or communication message(s)) from the caller/sender). In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided herein approaches to automatically detect and prevent backup of content items from a client system to a remote backup system based on specified criteria. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for automatically generating contact information of a caller/sender for a contact list of a recipient communication device, comprising:
   receiving a communication on the recipient communication device from the caller/sender using a sender communication device;
   determining a sender identifier associated with an incoming portion of the communication;
   determining the caller/sender is unknown to the recipient communication device based on the sender identifier;
   analyzing a content of the communication to determine identifying information for the caller/sender;
   performing one or more searches via a network to determine extended name information using the identifying information, the one or more searches including a search of a set of contacts belonging to established contacts in a social network associated with a user of the recipient communication device;
   retrieving a plurality of photographs depicting the caller/sender using at least one of the identifying information or the extended name information;
   selecting a photograph from among the plurality of photographs based on a pixel resolution of each photograph of the plurality of photographs;
   associating the selected photograph with the caller/sender; and
   generating contact information based on at least one of the identifying information or the extended name information, wherein the contact information includes a name, an additional telephone number, a home address, and the selected photograph.

2. The computer-implemented method of claim 1, further comprising storing the contact information for the caller/sender in the contact list of the recipient communication device.

3. The computer-implemented method of claim 1, wherein the communication includes a phone call, video call, or one or more communication messages.

4. The computer-implemented method of claim 1, wherein the network includes at least one of a social network, corporate directory, corporate profile, or scholastic directory.

5. The computer-implemented method of claim 1, wherein the communication includes a voice message and wherein the analysis of the content of the communication includes performing at least one of a voice signature analysis or a speech analysis based on voice signatures obtained from the established contacts.

6. The computer-implemented method of claim 1, wherein the identifying information includes a first name of the caller/sender.

7. A computer system for automatically generating contact information of a caller/sender for a contact list of a recipient communication device, the computer system comprising:
- a memory medium comprising program instructions;
- a bus coupled to the memory medium; and
- a processor for executing the program instructions, the instructions causing the system to:
  - receive a communication on the recipient communication device from the caller/sender using a sender communication device;
  - determine a sender identifier associated with an incoming portion of the communication;
  - determine the caller/sender is unknown to the recipient communication device based on the sender identifier;
  - analyze a content of the communication to determine identifying information for the caller/sender;
  - perform one or more searches via a network to determine extended name information using the identifying information, the one or more searches including a search of a set of contacts belonging to established contacts in a social network associated with a user of the recipient communication device;
  - retrieve a plurality of photographs depicting the caller/sender using at least one of the identifying information or the extended name information;
  - select a photograph from among the plurality of photographs based on a pixel resolution of each photograph of the plurality of photographs;
  - associate the selected photograph with the caller/sender; and
  - generate contact information based on at least one of the identifying information or the extended name information, wherein the contact information includes a name, an additional telephone number, a home address, and the selected photograph.

8. The computer system of claim 7, further comprising program instructions to store the contact information for the caller/sender in the contact list of the recipient communication device.

9. The computer system of claim 7, wherein the communication includes a phone call, video call, or one or more communication messages.

10. The computer system of claim 7, further comprising program instructions to retrieve one or more photographs depicting the caller/sender using at least one of the identifying information or the extended name information, selecting a photograph from among the one or more photographs, and associating the selected photograph with the caller/sender.

11. The computer system of claim 7, wherein the network includes at least one of a social network, corporate directory, corporate profile, or scholastic directory.

12. The computer system of claim 7, wherein the communication includes a voice message and wherein the analysis of the content of the communication includes performing at least one of a voice signature analysis or a speech analysis based on voice signatures obtained from the established contacts.

13. The computer system of claim 7, wherein the identifying information includes a first name of the caller/sender.

14. A computer program product for automatically generating contact information of a caller/sender for a contact list of a recipient communication device, the computer program product comprising a computer readable storage device, and program instructions stored on the computer readable storage device, to:
- receive a communication on the recipient communication device from the caller/sender using a sender communication device;
- determine a sender identifier associated with an incoming portion of the communication;
- determine the caller/sender is unknown to the recipient communication device based on the sender identifier;
- analyze a content of the communication to determine identifying information for the caller/sender;
- perform one or more searches via a network to determine extended name information using the identifying information, the one or more searches including a search of a set of contacts belonging to established contacts in a social network associated with a user of the recipient communication device;
- retrieve a plurality of photographs depicting the caller/sender using at least one of the identifying information or the extended name information;
- select a photograph from among the plurality of photographs based on a pixel resolution of each photograph of the plurality of photographs;
- associate the selected photograph with the caller/sender; and
- generate contact information based on at least one of the identifying information or the extended name information, wherein the contact information includes a name, an additional telephone number, a home address, and the selected photograph.

15. The computer program product of claim 14, further comprising program instructions to store the contact information for the caller/sender in the contact list of the recipient communication device.

16. The computer program product of claim 14, wherein the communication includes a voice message and wherein the communication includes a phone call, video call, or one or more communication messages.

17. The computer program product of claim 14, further comprising program instructions to retrieve one or more photographs depicting the caller/sender using at least one of the identifying information or the extended name information, selecting a photograph from among the one or more photographs, and associating the selected photograph with the caller/sender.

18. The computer program product of claim 14, wherein the network includes at least one of a social network, corporate directory, corporate profile, or scholastic directory.

19. The computer program product of claim 14, wherein the analysis of the content of the communication includes performing at least one of a voice signature analysis or a speech analysis based on voice signatures obtained from the established contacts.

* * * * *